United States Patent [19]
Kirch

[11] Patent Number: 4,987,959
[45] Date of Patent: Jan. 29, 1991

[54] FARM MACHINE FOR WORKING THE SOIL
[75] Inventor: Michel Kirch, Etting, France
[73] Assignee: Kuhn, S.A., Saverne, France
[21] Appl. No.: 165,093
[22] Filed: Mar. 7, 1988
[30] Foreign Application Priority Data Mar. 6, 1987 [FR] France ................................. 8703219

[51] Int. Cl.5 ............................................. A01B 33/02
[52] U.S. Cl. .................................... 172/124; 172/556; 172/123; 172/39
[58] Field of Search ................ 172/124, 120, 119, 118, 172/123, 39, 604, 556

[56] References Cited

U.S. PATENT DOCUMENTS

| | | | |
|---|---|---|---|
| 476,684 | 6/1892 | Pichno | 172/556 |
| 2,098,472 | 11/1937 | Strandlund | |
| 2,155,739 | 4/1939 | Seaholm | |
| 2,271,354 | 1/1942 | Strandlund | |
| 3,297,095 | 1/1967 | Van der Lely | |
| 3,633,679 | 1/1972 | Dahlberg | |
| 4,564,073 | 1/1986 | Ide | 172/120 |

FOREIGN PATENT DOCUMENTS

| | | | |
|---|---|---|---|
| 211867 | 6/1956 | Australia | 172/124 |
| 8304158 | 12/1983 | Australia | |
| 0188633 | 1/1985 | European Pat. Off. | |
| 0152892 | 2/1985 | European Pat. Off. | |
| 0162197 | 11/1985 | European Pat. Off. | |
| 1142295 | 9/1957 | France | |
| 2148368 | 3/1973 | France | |
| 433843 | 10/1967 | Switzerland | |
| 915903 | 11/1960 | United Kingdom | 172/124 |
| 1192699 | 5/1970 | United Kingdom | |
| 8400465 | 2/1984 | United Kingdom | |
| 2133663 | 8/1984 | United Kingdom | |

OTHER PUBLICATIONS

"Machines for Field Work", pp. 40-45, Budapest, 1978.

Primary Examiner—Richard J. Johnson
Attorney, Agent, or Firm—Oblon, Spivak, McClelland, Maier & Neustadt

[57] ABSTRACT

The farm machine 1 for working the soil comprises tools 21 each of which consists of a concave disk 47 provided with a plurality of spades 48 at its periphery. The concavity of the concave disk 47 is directed toward the forward end 12 of the rotor 16, considering the work direction 3 of the farm machine 1. A lateral stabilizing element 41 comprising at least one share 43 extends behind the rearward lateral end 11 of the frame 9 of said farm machine 1. The farm machine 1 also comprises support wheels 36, 38, one 36 of which extends in front of the forward lateral end 12 of said frame 9.

24 Claims, 5 Drawing Sheets

FARM MACHINE FOR WORKING THE SOIL

FIELD OF THE INVENTION

This invention relates to a farm machine for working the soil comprising a rotor equipped with tools for working the soil. The rotor is driven positively by a drive source around its longitudinal axis, which extends obliquely in relation to the direction of work of the machine so that, at the level of the soil, the tools for working the soil move backward, considering the direction of work. Each of the tools for working the soil comprises a concave disk the periphery of which is round or arbitrary and the concavity of which is directed toward the forward end of the rotor.

BACKGROUND OF THE INVENTION

Such machines are known the concave disks of which have a spherical cap shape the edge of which is circular or notched. However, these known machines have several drawbacks.

A first drawback of the known machines resides in the fact that the smooth or notched disks cut weeds, which causes the weeds to proliferate. This proliferation is particularly great in the case of couch grass. The elimination of this increased mass of weeds requires a very large volume of weed-killing products, which increases production costs and dangers for the environment.

A second drawback of the concave disks equipping the known machines resides in the creation of a large plow sole which prevents the flow of water into the ground and the growth of the root system of the plants. Moreover, in clayey soils, the concave disks cause a considerable smoothing of clods, which is detrimental to their later breakup during the preparation of a seed bed. In addition, in clayey soils, the concave disks also have a tendency to clog very quickly. On the other hand, in loam soils, the concave disks cause a pulverizing of the soil which promotes the formation of extremely hard, harmful layers after precipitations.

A third drawback of the known machines resides in the fact that, in dry soils, the concave disks penetrate into the soil with much difficulty, or even do not penetrate at all.

A fourth drawback of the known machines relates to the relatively rapid wear of the concave disks. Since the concave disks cut the soil, their thickness must necessarily be relatively small. However, this thinness causes rapid wear.

OBJECT OF THE INVENTION

The object of this invention is to create a machine for working the soil of the known type which, however, no longer has the drawbacks of the known machines.

SUMMARY OF THE INVENTION

For this purpose, the machine according to this invention is characterized by the fact that each concave disk is equipped on its periphery with a plurality of spades. With this characteristic, the machine according to the invention no longer possesses the drawbacks of the existing machines.

First, with this machine, the weeds are no longer cut, but are uprooted. Their proliferation is thus stopped.

Second, as the spades, one after the other, attack the soil to be worked, there is no longer a formation of a plow sole. Moreover, this also makes it possible to obtain, in dry and hard soils, a good penetration. This is due to the fact that a spade penetrates much more easily into the soil than does a continuous disk. This effect of improved penetration is substantially accentuated by the fact that the tools for working the soil are driven positively in rotation.

Third, in clayey soil, the presence of spades means that the smoothing of the clods is greatly reduced, or is even nonexistent. In loam soils, the machine makes it possible to form clods, but does not pulverize the soils. Water can thus penetrate into the soil and not cause the formation of hard layers.

Fourth, the concave disk, by the concave part, forms a surface which substantially facilitates the transport of the soil dug up by the spades. This achieves a good turning over of the soil without, however, creating smoothing at the bottom of the furrow which is worked by the spades. In the machine according to the invention, the concave disks thus have only a transport role.

Fifth, since the concave disks does not directly work the soil by their peripheries, their thickness can be greater than that of standard concave disks. In addition, since their peripheries are not active, the wear of the disks is almost nonexistent radially.

Advantageously, the outside diameter of the concave disks used in the invention have values of between 500 and 700 millimeters.

Advantageously also, the spades go beyond the outside perimeter of the concave disks on which they are mounted by a distance of between 50 and 125 millimeters.

According to an additional characteristic of the invention, the direction of the front edge of the spades forms, with a direction radial to the concave disks and approximately going through the point of the front edge farthest from the axis of the rotor, an angle of between 0° and 45° in the direction opposite to the direction of rotation of the tool for working the soil.

An angle near 0° will be preferred when it is desired that the spades perform very aggressive work. In this case, however, the power to be used to drive the machine will be great.

An angle moving away from 0° will be preferred when it is desired to reduce the power to be used to drive the machine. In this case, the spades will have a relatively dragging path in the soil and will be less aggressive. This latter arrangement will also make the spades less sensitive to the catching of plant debris, given that the dragging position of the front edges of the spades will force the plant debris to slide along them without the debris being able to remain caught there.

A better digging up of the clods of earth is further obtained when the front edges of the active parts of the spades are bevelled. This bevelling of the front edge of the active part of the spades also contributes to reducing the power consumption and improving the penetration of the spades in extremely dry and hard soils.

According to another characteristic of the invention, the upper edge of a spade makes, with a direction tangential to the path circle of the tool for working the soil at the point of the front edge farthest from the axis of the rotor, a reentrant angle toward the inside. This form of the free end of the spade makes it possible, in operation, to obtain an angle between the upper edge of the spade and the soil such that the bumping of the spade is avoided.

According to an additional characteristic of the invention, the spades extend at least approximately in the extension of the concave disks on which they are mounted. This arrangement makes it further possible to improve considerably the turning over and the transport of the earth which is dug up at the bottom of the furrow.

According to another characteristic of the invention, at least the fastening part of the spades has a curved shape corresponding to the curvature of the concave disks.

Advantageously, the spades are fastened to the convex back face of the concave disks. This arrangement makes it possible to keep the concave face of the concave disks perfectly continuous and without possible catching points for the earth and plant debris which are carried there, which prevents packings as much as possible.

The spades are further mounted in a removable way on the concave disks. This makes it possible to have the worn parts (i.e., the spades) very easily and inexpensively interchangeable.

According to an additional characteristic of the invention, each concave disk is connected in a removable way to a flange solid with the central beam of the rotor. Preferably, the central opening of each concave disk and the peripheral shape of the flanges are such that, in at least one determined angular position, the concave disk can clear the flanges. Thanks to this arrangement, each concave disk can be made in a single piece, which gives it an optimum rigidity, while being able to be easily mounted on and removed from the rotor. Finally, to prevent packings at the level of the central opening of the concave disks, the opening of each concave disk is plugged at least partially by a plugging device.

According to an additional characteristic of the invention, a scraper-mould board is associated with each concave disk and works with the concave face of each concave disk. The scraper-mould boards make it possible to prevent a harmful accumulation of earth which could adhere to the concave faces of the concave disks and eliminates the plant debris that could possibly be remaining caught on the spades. Moreover, these scraper-mould boards are above all mould boards which complete (by considerably improving it) the turning over of the soil dug up by the spades and transported by the concave disks.

According to another characteristic of the invention, the back part of each scraper-mould board forms, with a plane tangent to the curvature of the concave disk and resting on the perimeter of the concave disk in the zone of the scraper-mould board, an angle at between 10° and 40°. Advantageously this angle is at least approximately 20°. This arrangement makes it possible to obtain a good turning over of the soil while limiting as much as possible the interference to the advancement constituted by the scraper-mould board on which the soil slides with a certain contact pressure.

According to another characteristic of the invention, the scraping edge of each scraper-mould board is located below the horizontal plane passing through the axis of the rotor. This arrangement makes it possible to begin very early the turning of the dugup soil and to improve its advance. This also makes it possible to reduce the length of the scraper-mould board and, therefore, to reduce even more the harmful friction.

So that this passage of the earth from the concave disk on the corresponding scraper-mould board is performed under good conditions, the angle of incidence of the scraper-mould board in relation to the concave disk is advantageously between 10° and 30°. Preferably, this angle is at least approximately 20°.

According to another characteristic of the invention, the back part of each scraper-mould board has a length of between 150 and 450 millimeters. Advantageously, this length is at least approximately 300 millimeters. This makes it possible also to reduce the power necessary for the work by reducing the friction distance of the earth on the back part of the scraper-mould board. In addition, the smoothing of the earth is also reduced.

According to an additional characteristic of the invention, a lateral stabilizing element connected to the frame by a carrying structure equips the rearward lateral end of the frame of the machine. Advantageously, this lateral stabilizing element consists of at least one share.

Advantageously also, the carrying structure comprises a deformable quadrilateral. Preferably this quadrilateral is at least approximately a parallelogram. This carrying structure comprises, in addition, a hydraulic cylinder which acts on one of the bars of the deformable quadrilateral so as to determine the height of the share in relation to the frame. This arrangement makes it possible for the user to easily keep the heading of the machine. This is all the more easy as the depth of action of the share constituting the lateral stabilizing element (i.e., its height in relation to the frame) is adjustable from the driving compartment of the tractor vehicle by action on control elements connected to the hydraulic jack acting on the deformable quadrilateral. This, therefore, makes it possible for the user to intensify at will the action of the lateral stabilizing element if a lateral deviation of the machine occurs during work, due for example to a local change in the configuration of the ground that the machine is working.

According to the invention, the lateral stabilizing share is able to be equipped with a triggering device making it possible for the share to be disengaged when it encounters an obstacle buried in the ground (such as a large stone, for example). Advantageously, this triggering device is integrated into the control elements connected to the hydraulic cylinder acting on the deformable quadrilateral.

According to another characteristic of the invention, the carrying structure of the lateral stabilizing element is connected in an articulated way to the frame by a pin connection directed upward and is held in a selected position in relation to the frame by an adjustable holding element. This arrangement makes it possible to adjust in an optimum way the position of the lateral stabilizing element and to be able to fold the lateral stabilizing element back toward the inside of the machine during the transport phases to reduce the transport width of the machine.

According to another characteristic of the invention, the machine is equipped with support wheels one of which is placed at the forward end of the frame and advantageously in front of a side housing also placed at the forward end of the frame. This particular arrangement of this support wheel, on the one hand, makes possible a good support of the machine and, on the other hand, makes it possible to prevent the side housing from bumping and rubbing on the ground. This leads to preventing packing in this zone and to limiting the wear of the lower part of the side housing.

BRIEF DESCRIPTION OF THE DRAWINGS

FIG. 3a shows another arrangement of the spade.

DETAILED DESCRIPTION OF THE PRESENTLY PREFERRED EMBODIMENT

Figure 1:
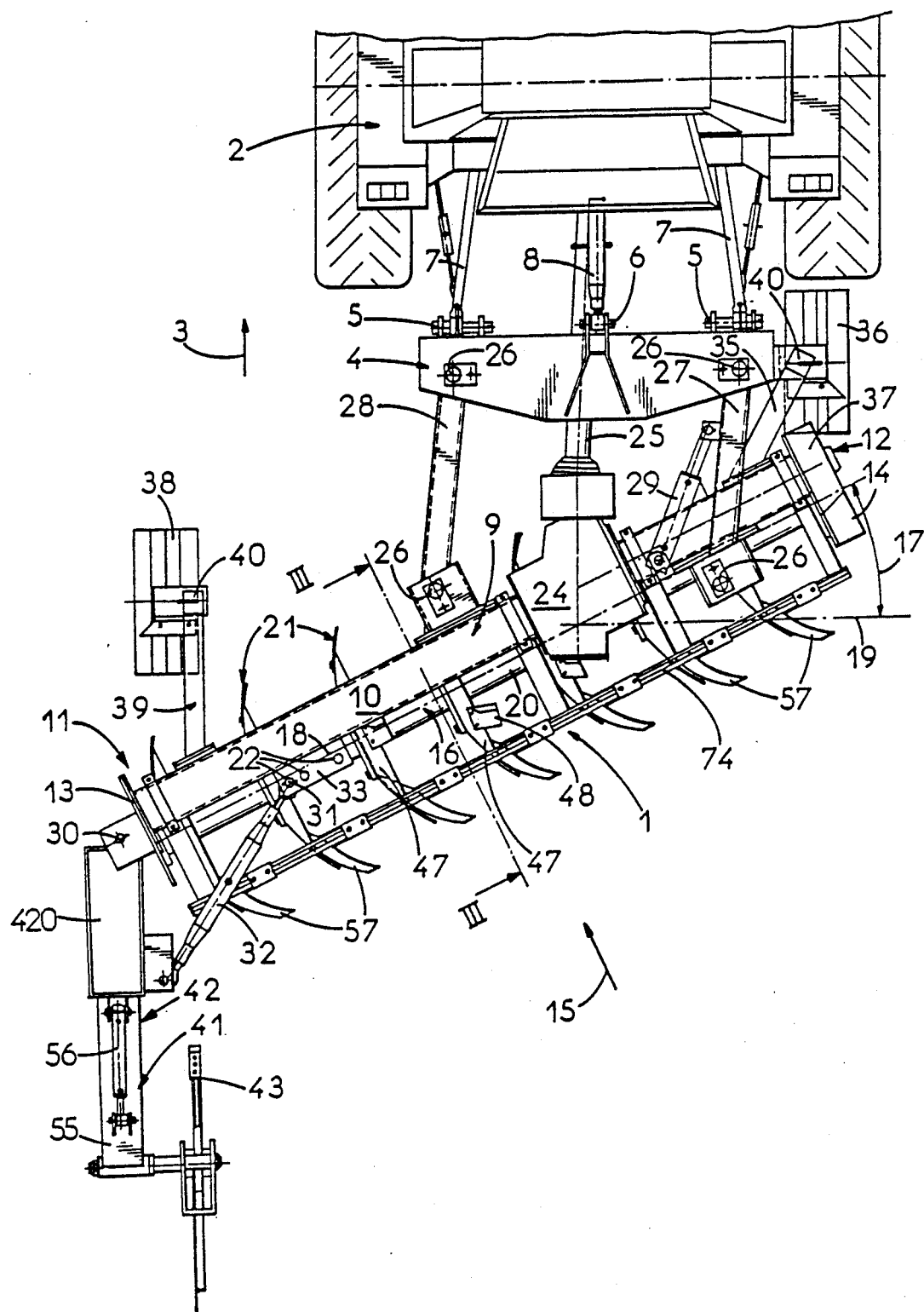
FIG. 1 shows in top view an embodiment of a machine according to the invention hitched to a tractor.

In FIG. 1, a farm machine 1 for working the soil according to the invention is hitched to a farm tractor which pulls it in the work direction 3.

For this purpose, the farm machine 1 is equipped with a hitching structure 4 which comprises two lower hitching points 5 and one upper hitching point 6. The lower hitching points 5 are coupled to lower arms 7, and the upper hitching point 6 is coupled to a thrust rod 8 of the three-point hitching mechanism of the farm tractor 2.

The back part of the hitching structure 4 is fastened to a frame 9 of the farm machine 1. The frame 9 is composed of an upper crosspiece 10 which has at each of its ends 11, 12 a side wall 13, 14 extending downward. Seen along arrow 15, the frame 9 has an inverted U shape. Seen from above, the frame 9 extends obliquely in relation to the work direction 3 so that its right end 12 is located more forward than its left end 11.

Between the lower ends of the side walls 13, 14 is placed a rotor 16 which extends parallel to the frame 9. Seen from the back in the work direction 3, the right end of the rotor 16 is located more forward than the left end of the rotor 16. The angle 17 which the longitudinal axis 18 of the rotor 16 makes with a perpendicular 19 to the work direction 3 in the horizontal plane is preferably between 20° and 35°. In the embodiment described, the angle 17 is at least approximately equal to 26°.

The rotor 16 is composed of a central beam 20 on which tools 21 for working the soil are fastened. According to the invention, each of the tools 21 consists of a concave disk 47 the concavity of which is directed toward the right end of the rotor 16, which is the end of the rotor 16 that extends farthest forward, considering the work direction 3. Spades 48 are placed on the periphery of each concave disk 47.

Figure 3:
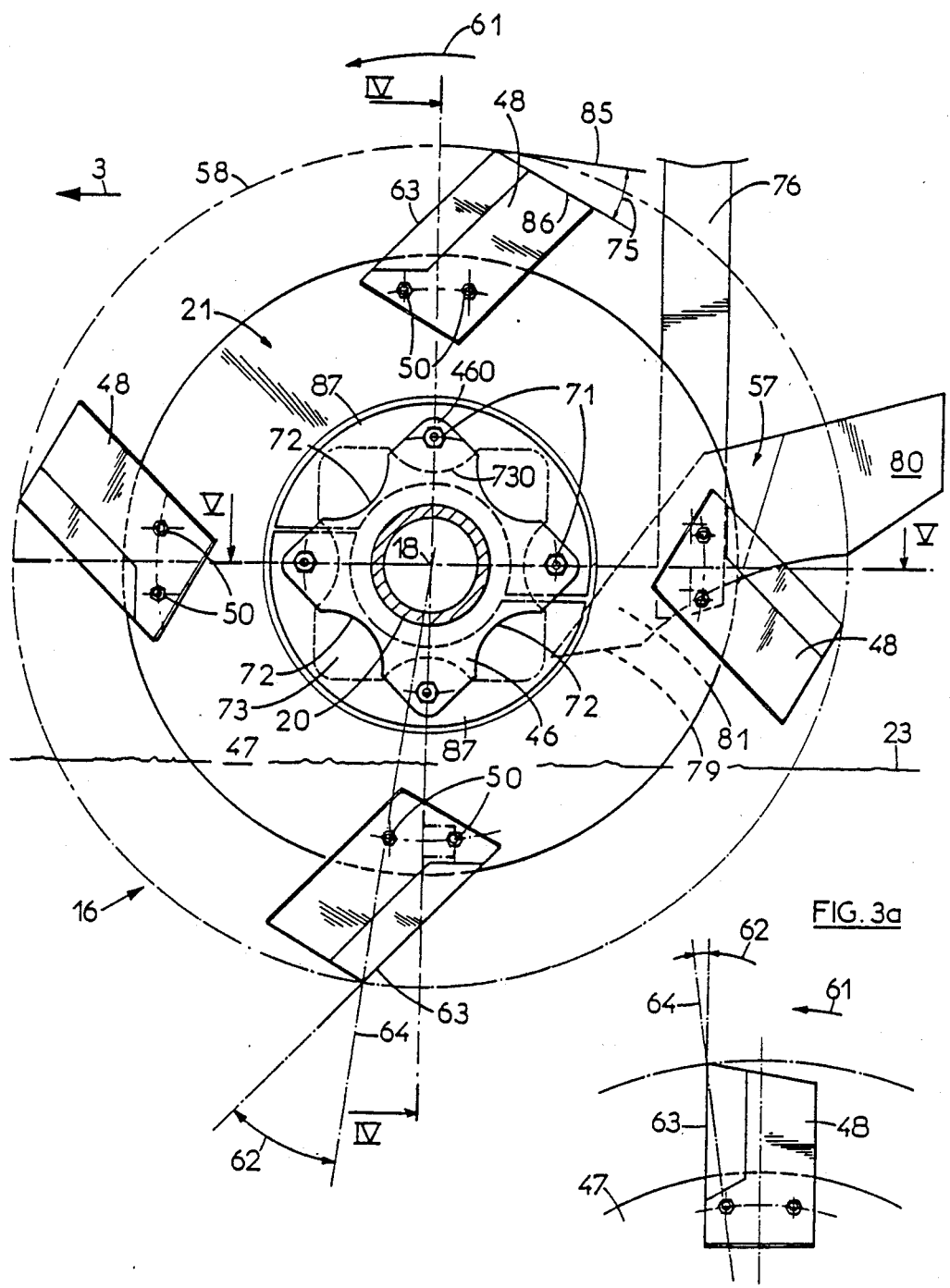
FIG. 3 shows, on a larger scale, a section of the rotor along the plane III-III defined in FIG. 1.

During work, the rotor 16 is driven positively in rotation around its longitudinal axis 18 so that the tools 21 move at the level of the ground 23 from the front toward the back (see FIG. 3). For this purpose, the frame 9 has, at least approximately at the level of the longitudinal plane of symmetry of the farm tractor 2, a transmission housing 24 which is made in the form of a gear box. The transmission housing 24 receives the movement of the power takeoff shaft (not shown) of the farm tractor 2 by a transmission shaft with universal joints 25.

Furthermore, the transmission housing 24 is connected mechanically with a side housing 37 located at the right end 12 of the frame 9. The side housing 37 forms the side wall 14. The transmission housing 24 thus transmits to the side housing 37 the rotary movement received from the farm tractor 2. The side housing 37 then transmits the rotary movement to the rotor 16 in a way known in the art.

It is further seen that, in front of its ends 11, 12, the frame 9 is equipped with two support wheels 36, 38 which roll over the ground 23 during work. The support wheels 36, 38 are connected to the frame 9 by support structures 35, 39 made so that the positions of the support wheels 36, 38 can be modified vertically in relation to the frame 9 thanks to an adjustment mechanism 40 which is shown in greater detail in FIG. 2.

The support wheel 36, which is located on the right end 12 of the frame 9, extends in front of the side housing 37. During work, the support wheel 36 rolls in a furrow.

At the back of the left end 11 of the frame 9 is fastened a lateral stabilizing element 41. The lateral stabilizing element 41 is connected to the frame 9 by a support structure 42 which is also seen in greater detail in FIG. 2.

The lateral stabilizing element 41 consists of a share 43 which is engaged in the soil during work. The lateral stabilizing element 41 absorbs the crosswise force which is exerted on the rotor 16 during work and which is produced by the inclination of the rotor 16.

At the back of the upper crosspiece 10 of the frame 9 is fastened a beam 74 on which are fastened scraper-mould boards 57 each of which is associated with a tool 21.

It is also shown in FIG. 1 that the connection between the hitching structure 4 and the frame 9 is made with two connecting rods 27, 28. Each of these two connecting rods 27, 28 is mounted in an articulated way, on the one hand, on the hitching structure 4 and, on the other hand, on the upper crosspiece 10 of the frame 9 by a joint 26 with the pin directed upward. A hydraulic cylinder 29 makes it possible to maneuver the deformable quadrilateral thus formed by the connecting rods 27, 28 (a parallelogram in the example described) to bring the farm machine 1 into a work position (as shown) or into a transport position (not shown).

In the transport position, the farm machine 1 is recentered in relation to the median plane of the farm tractor 2 so that the overall bulk of the machine is reduced. To reduce the lateral bulk of the machine even more, during transport the lateral stabilizing element 41 can be folded back behind the rotor 16. To do this, the support structure 42 is connected to the frame 9 by a joint 30 with a pin directed upward.

The locking of the lateral stabilizing element 41 in its work position and in its transport position is performed by changing the position of a pin 31 of a holding connecting rod 32 on a yoke 33 fastened to the frame 9. The yoke 33 has for this purpose different holes 22 sized, shaped, and positioned to receive the pin 31.

Figure 2:
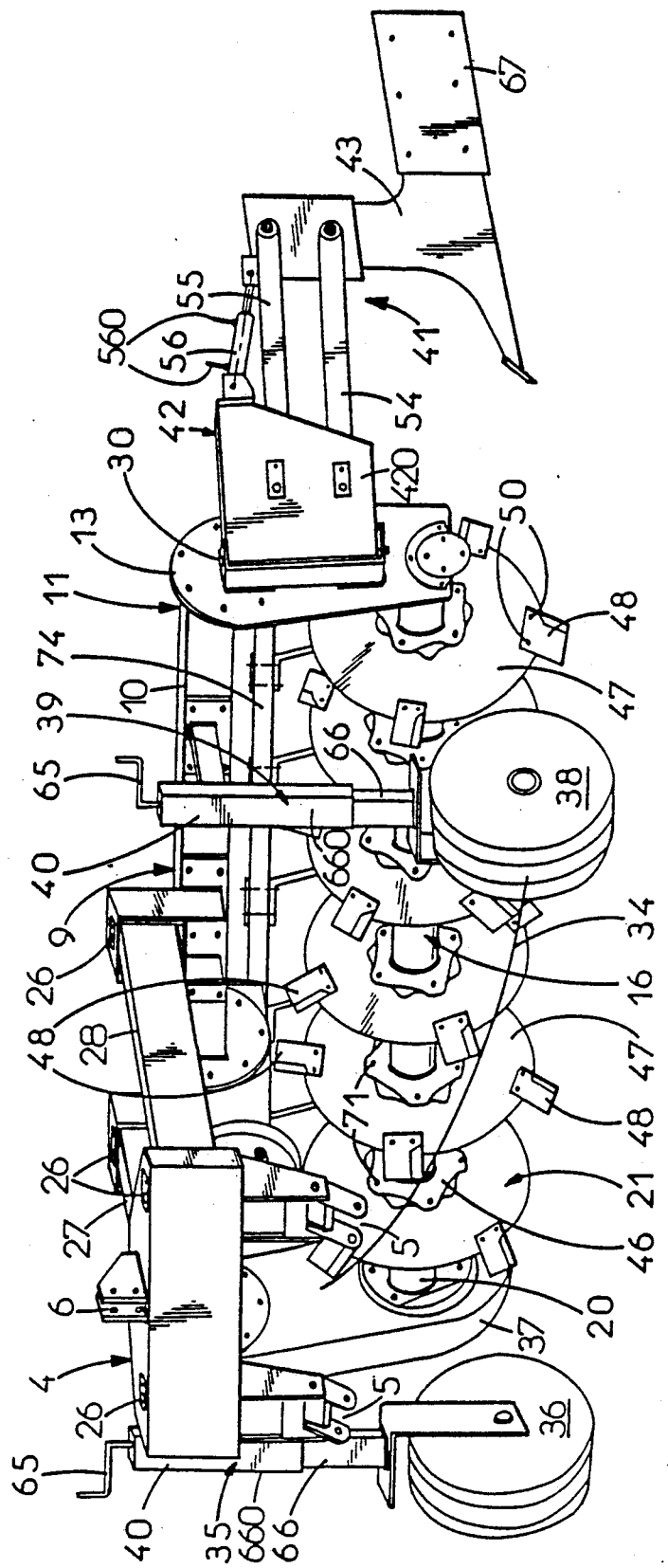
FIG. 2 shows, seen in three-fourths front perspective, the left end of the machine of FIG. 1.

In FIGS. 2 and 3, the rotor 16 is seen in a more detailed way to consist of the central beam 20 on which flanges 46 are fastened at regularly spaced intervals. The flanges 46 are used to fasten tools 21 to the central beam 20. The fastening of each tool 21 is achieved by means of four bolts 71.

The flanges 46 are arranged on the central beam 20 so that each tool 21 is angularly offset around the longitudinal axis 18 of the rotor 16 in relation to the adjacent tools 21. Each tool 21 consists of a concave disk 47 on which a group of spades 48 is fastened. In the example described, each tool 21 comprises four spades 48 mounted equidistantly on the concave disk 47. The corresponding spades 48 of two consecutive tools 21 thus produce a helix 34 for a gradual penetration into the soil 23 of the various tools 21.

Each spade 48 is fastened to the corresponding concave disk 47 by bolts 50.

On the right of FIG. 2, the arrangement of the lateral stabilizing element 41 is clearly seen. This consists of the share 43 connected to the left end 11 of the frame 9, which is the rearward end, by the support structure 42. The support structure 42 is, as said above, connected to the side wall 13 of the frame 9 by the joint 30 with a pin directed upward, and it is held in a selected position by the holding connecting rod 32. The support structure 42 comprises a stabilizing support 420 at the back of which two bars 54, 55 extend. The bars 54, 55 connect the share 43 to the stabilizing support 420. The connection of the bars 54, 55 to the stabilizing support 420 and to the share 43 is performed in an articulated way in such a way as to create a deformable quadrilateral extending in an at least approximately vertical plane. The deformable quadrilateral is at least approximately a parallelogram. A double acting hydraulic cylinder 56 that extends between the stabilizing support 420 and the upper bar 55 of the parallelogram acts on the parallelogram.

The hydraulic cylinder 56 is controlled by hydraulic control elements 560. This constitution of the lateral stabilizing element 41 makes it possible for the user to modify the intensity of action of the lateral stabilizing element 41 during work by acting from the driver's compartment of the farm tractor 2 on the control elements 560 of the hydraulic cylinder 56.

The share 43 comprises at the back a plate 67 that gives the share 43 a good stabilizing capability.

The hydraulic control elements 560 can be provided with a triggering device that makes it possible for the share 43 to be disengaged from the soil 23 when it encounters an obstacle buried in the soil 23 (such as a large stone, for example).

In FIG. 2, in the foreground, the support wheels 36, 38 and their respective support structures 35, 39 with their adjustment mechanisms 40 are further seen. The adjustment is performed by means of a crank 65 solid with a bolt (not shown) acting on a nut (not shown) solid with an upright 66 connected to the corresponding support wheel 36, 38. Each upright 66 slides in a corresponding tube 660 connected to the frame 9. Adjusting the relative height between the frame 9 and the support wheels 36, 38 makes it possible to modulate at will the work depth of the tools 21.

In FIGS. 3, 3a, 4, and 5, the shape of the tools 21 and the arrangement of each scraper-mould board 57 in relation to the corresponding tool 21 are shown.

In the example shown in FIG. 3, each spade 48 is mounted on the corresponding concave disk 47 so as to be greatly inclined in a direction opposite the direction of rotation 61 of the tool 21. The inclination of the spades 48 in the direction opposite the direction of rotation 61 is such that the angle 62 formed by the front edge 63 of each spade 48 and a radial direction 64 going through the longitudinal axis 18 of the rotor 16 and the point of the front edge 63 farthest from the longitudinal axis 18 has a value of between 0° (in FIG. 3a, the angle 62 is very close to 0°) and 45°.

Moreover, the front edge 63 of each spade 48 is advantageously bevelled.

As said above, on each concave disk 47 are mounted four spades 48 each connected to the corresponding concave disk 47 by two bolts 50. Each of the spades 48 exhibits a reentrant angle shown by the angle 75 between a direction 85 tangential to the extreme circular path 58 described by the spades 48 and the radially outer edge 86 of the corresponding spade 48. The angle 75 is directed to the inside of the tool 21.

Figure 4:
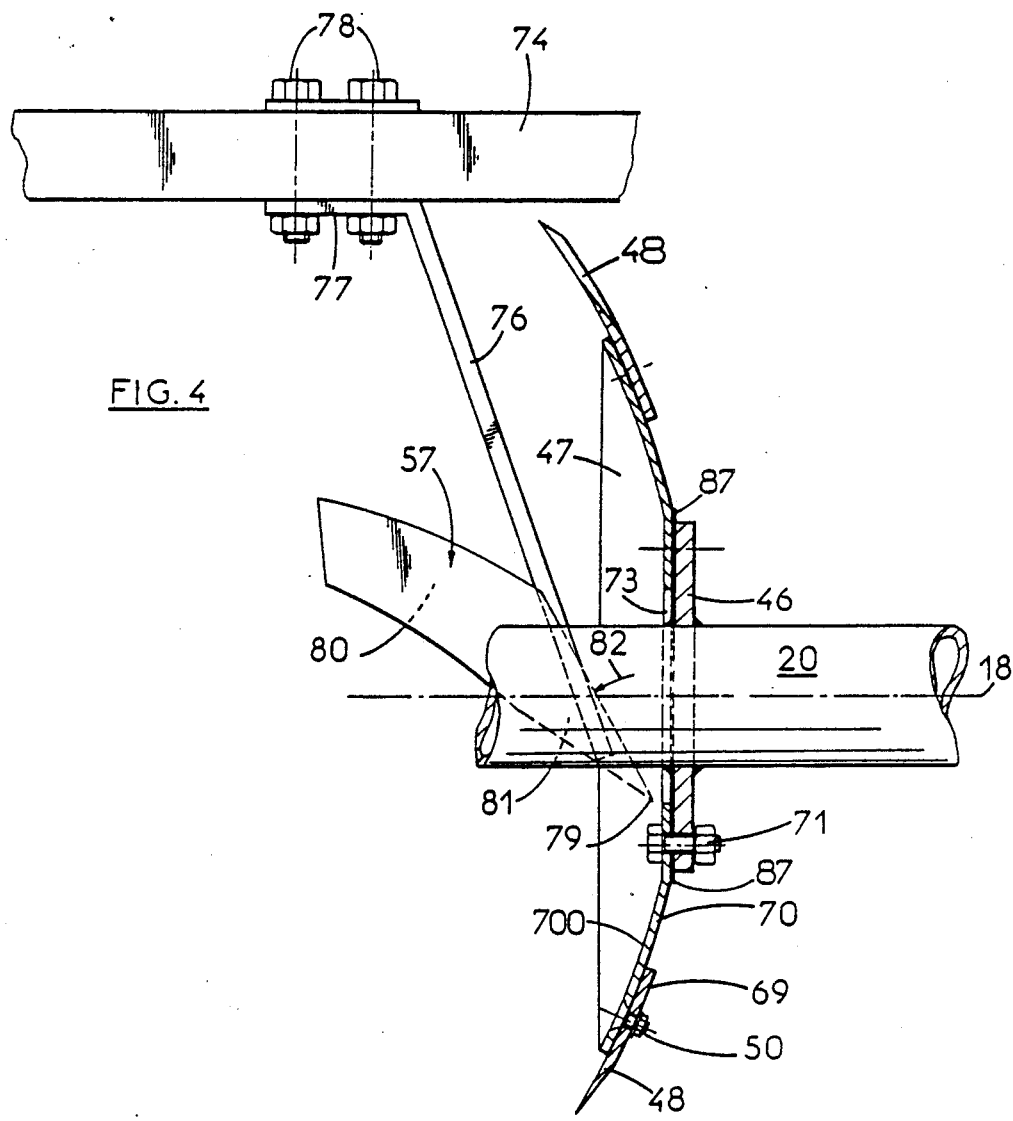
FIG. 4 shows, on a larger scale, a partial view of the rotor with a tool for working the soil, in section along plane IV-IV defined in FIG. 3, and the scraper-mould board associated with the tool.
Figure 5:
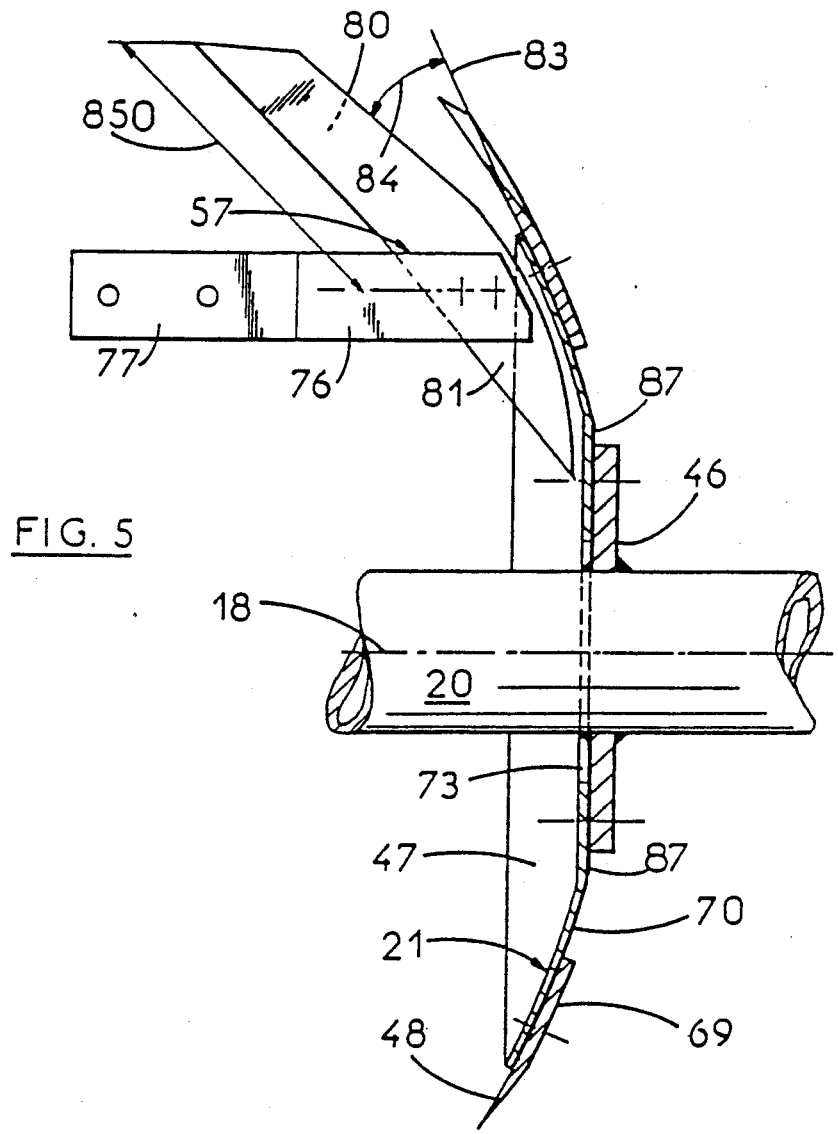
FIG. 5 shows, on a larger scale, a partial view of the rotor with a tool, in section along plane V-V defined in FIG. 3, and the scraper-mould board (not shown in section) associated with the tool.

In FIGS. 3, 4, and 5, the mode of fastening a concave disk 47 to the central beam 20 of the rotor 16 is also seen. As previously stated, each concave disk 47 is fastened to a corresponding flange 46 by four bolts 71. Each flange 46 is, in turn, mounted on the central beam 20. Each flange 46 has a special peripheral shape. In the example shown, each flange 46 consists of a square plate on each side of which a curved portion 72 has been removed. Each flange 46 thus appears like a star having four points 460. In each of the points 460, a passage hole has been made for one of the bolts 71.

Each concave disk 47 has a central opening 73 that has a shape complementary to that of the flange 46. In the example shown, the central opening 73 is square and comprises in the middle of each side of the square a curved projecting portion 730. The central opening 73 of each concave disk 47 thus comprises four curved projecting portions 730. In each of the curved projecting portions 730, a passage hole has been made for a corresponding one of the bolts 71.

These particular shapes make it possible for the concave disks 47, in a certain angular position, to clear the flanges 46 when the shapes are made to coincide. This is for the purpose of bringing one of the concave disks 47 to the position of the flange 46 on which it will be mounted by slipping the concave disk 47 on the central beam 20. When each concave disk 47 has arrived at the position of the flange 46 on which it is to be mounted, the concave disk 47 is made to turn 45° around its axis so as to cause the passage holes made in the curved projecting portions 730 to coincide with the passage holes made in the points 460 of the corresponding flange 46.

To plug the portion of the central opening 73 of the concave disk 47 that is not plugged by the flange 46, two half-washers 87 are placed between each concave disk 47 and the corresponding flange 46. The two half-washers 87 also each have passage holes for the bolts 71.

In FIGS. 4 and 5, it is seen that the spades 48 extend in the extension of the concave disk 47 on which they are mounted. In addition, each spade 48 has a fastening part 69 curved in a way that is at least approximately identical with the convexity of the back face 70 of the corresponding concave disk 47. The spades 48 can thus be mounted on the back face 70 of the corresponding concave disk 47. In addition, it is seen in FIG. 4 that the bolts 50 which fasten each spade 48 in a removable way on the corresponding concave disk 47 are countersunkhead bolts so that the head of each bolt does not go beyond the concave face 700 of the corresponding concave disk 47 on which the earth and plant debris uprooted by the spades 48 slide. The concave face 700 of each concave disk 47, therefore, has no roughness in the zone where the earth and plant debris slide. This makes it possible to prevent packing of the concave disks 47.

As said above, beyond the upper cross piece 10 of the frame 9, the beam 74 supports at regular intervals the scraper-mould boards 57 (see FIG. 1). Each scraper-mould board 57 works with a tool 21.

The scraper-mould boards 57 are shown in greater detail in FIGS. 3, 4, and 5. Each scraper-mould board 57 is fastened to the beam 74 by a fastening lug 76 bent in its upper part to exhibit a horizontal part 77 pierced with two holes for the passage of fastening bolts 78 which make the horizontal part 77 solid with the beam 74. Each scraper-mould board 57 has an active part 81 which is composed of two parts. The first part is a scraping edge 79 which extends close to the concave face 700 of the corresponding concave disk 47 and advantageously lower than the horizontal plane containing the longitudinal axis 18 of the rotor 16. The second part is a plow mould board 80. The scraping edge 79 of each scraper-mould board 57 scrapes the earth carried by the corresponding tool 21 while the mould board 80 completes turning over the soil. Since the scraping edge 79 extends below the horizontal plane containing the longitudinal axis 18 of the rotor 16, completing the turning over the carried earth begins very early. This ensures a better advance of the turning over.

The active part 81 of each scraper-mould board 57 possesses an angle of incidence 82 which makes it possible, inter alia, for the scraping edge 79 to loosen well the earth carried by the corresponding concave disk 47. The angle of incidence 82 has a value of between 10° and 30°. Preferably, the angle 82 is at least approximately 20°.

The back part of the mould board 80 of each scraper-mould board 57 forms an angle 84 of between 10° and 40° with a plane 83 tangential to the curvature of the corresponding concave disk 47 and resting on the perimeter of the corresponding concave disk 47 in the zone of the scraper-mould board 57. Preferably, the angle 84 is at least approximately 20°.

In addition, the length 850 of the back part of the mould board 80 of each scraper-mould board 57 is between 150 millimeters and 450 millimeters. Preferably, the length 850 is at least approximately 300 millimeters.

The machine according to the invention operates in the following manner:

During work, the farm machine 1 is hitched to the frame tractor 2, which pulls it in the work direction 3. Simultaneously, the power takeoff of the farm tractor 2 drives the rotor 16 in rotation in the direction of rotation 61. By rotating, the spades 48 each dig up clods of earth.

Since the longitudinal axis 18 of the rotor 16 extends obliquely in relation to the work direction 3, each spade 48 imparts to the clods it digs up a movement which is directed crosswise to the work direction 3. Each clod is then taken up by the concave face 700 of the corresponding concave disk 47, which begins to turn it over. Because of the presence of the corresponding scraper-mould board 57, it is certain that the clod will be loosened from the concave face 700 of the corresponding concave disk 47. Moreover, it is especially certain that it is perfectly turned over as desired. The scraper-mould board 57 actually completes the turning over of the clod begun by the concave disk 47.

Since the machine according to the invention is driven in rotation positively by a drive source, it is capable of working in very varied soils. In addition, the quality of the work provided is relatively constant.

Depending on the work to be done, the rotation speed of the rotor 16 and the working depth of the tools 21 can be regulated. The regulating of the rotation speed of the rotor 16 is performed by modifying the output speed of the transmission housing 24, while the working depth is regulated by adjusting the adjustment mechanism 40 of the support wheels 36, 38.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the U.S. is:

1. A farm machine for working the soil, said farm machine comprising:
    (a) a frame;
    (b) hitching means connected to said frame for hitching said machine to a tractor during use of said farm machine;
    (c) a rotor having a longitudinal axis that, during use of said machine, is at least approximately parallel to the ground and extends obliquely in relation to a work direction so that said rotor has a forward end and a rearward end considering said work direction, said rotor being equipped with:
        (i) a central beam and
        (ii) a plurality of tools for working the soil fastened to said central beam, each one of said plurality of tools for working the soil comprising:
            (A) a disk fastened to said central beam and having an outside perimeter, a concave face, and a convex face, said concave face being directed towards said forward end of said rotor, and
            (B) a plurality of spades removably fastened to said convex face of said disk, each one of said plurality of spades going beyond said outside perimeter of said disk and extending at least approximately in the extension of said disk;
    (d) a plurality of scraper-mould board units, each one of said plurality of scraper-mould board units being associated with a corresponding one of said plurality of tools for working the soil in such a manner that it extends, considering said work direction, behind said central beam and works with said concave face of said disk of said corresponding one of said plurality of tools for working the soil, each one of said plurality of scraper-mould board units comprising:
        (i) a scraper having a scraping edge:
            (A) which extends in part at least below an at least approximately horizontal plane containing said longitudinal axis of said rotor;
            (B) which extends close to the concave face of the corresponding one of said disks; and
            (C) which has an angle of incidence of less than 30°, said scraping edge being size, shaped, and positioned to scrape soil from the concave face of said disk, and
        (ii) a mould board:
            (A) which extends from said scraping edge and
            (B) which forms an angle of less than 40° with a plane tangential to the curvature of the corresponding one of said plurality of disks and resting on the perimeter of the corresponding one of said plurality of disks in the zone of said scraper-mould board unit, said mould board being sized, shaped and positioned to turn over the soil dug up by the corresponding spades and transported by the corresponding one of said disks; and
    (e) driving means receiving movement, during use, from a power source to rotate said rotor around its longitudinal axis in a direction of rotation such that said plurality of tools for working the soil are moving forward at their highest positions.

2. A farm machine according to claim 1 wherein said scraping edge extends entirely below said at least approximately horizontal plane.

3. A farm machine as recited in claim 1 wherein:
(a) the outside perimeter of said disk of each one of said plurality of tools for working the soil is at least approximately round; and
(b) said outside perimeter has a diameter of between 500 and 700 millimeters.

4. A farm machine as recited in claim 3 wherein each one of said plurality of spades goes beyond said outside perimeter of said disk of each one of said plurality of tools for working the soil by a distance of between 50 and 125 millimeters.

5. A farm machine as recited in claim 1 wherein:
(a) each one of said plurality of spades mounted on said disk of each one of said plurality of tools for working the soil comprises a front edge, said front edge having a point extending farthest from said longitudinal axis of said rotor; and
(b) said front edge forms with a direction radial to said disk and passing at least approximately through said point of said front edge farthest from said longitudinal axis of said rotor an angle of between 0° and 45° in a direction opposite said direction of rotation of said rotor.

6. A farm machine as recited in claim 1 wherein:
(a) each one of said plurality of spades mounted on said disk of each one of said plurality of tools for working the soil comprises a front edge, said front edge having a point extending farthest from said longitudinal axis of said rotor, said point describing an extreme circular path;
(b) each one of said plurality of spades mounted on said disk of each one of said plurality of tools for working the soil comprises an upper edge; and
(c) said upper edge forms with a direction tangential to said extreme circular path an angle towards said longitudinal axis of said rotor.

7. A farm machine as recited in claim 1 wherein:
(a) each one of said plurality of spades mounted on said disk of each one of said plurality of tools for working the soil comprises a front edge; and
(b) said front edge is bevelled.

8. A farm machine as recited in claim 1 wherein:
(a) said disk of each one of said plurality of tools for working the soil has a curved shape;
(b) each one of said plurality of spades mounted on said disk has a fastening part; and
(c) said fastening part has a curved shape corresponding to the curved shape of said disk.

9. A farm machine as recited in claim 1 wherein:
(a) each one of said plurality of tools for working the soil is angularly offset around said longitudinal axis of said rotor in relation to the adjacent one or ones of said plurality of tools for working the soil, and
(b) the angular offset between adjacent tools for working the soil is at least approximately constant along said rotor.

10. A farm machine as recited in claim 1 wherein said plurality of spades are mounted in an at least approximately equidistant manner on said disk of each one of said plurality of tools for working the soil.

11. A farm machine as recited in claim 1 wherein:

(a) said central beam comprises a plurality of flanges solid with said central beam; and
(b) the disk of each one of said plurality of tools for working the soil is connected in a removable way to a corresponding one of said plurality of flanges.

12. A farm machine as recited in claim 11 wherein:
(a) each one of said plurality of flanges has a peripheral shape;
(b) the disk of each one of said plurality of tools for working the soil has a central opening; and
(c) said central opening and said peripheral shape are such that, in at least one determined angular position, said disk of each one of said plurality of tools for working the soil can clear each one of said plurality of flanges.

13. A farm machine as recited in claim 12 wherein said central opening is at least partially plugged by a plugging means.

14. A farm machine as recited in claim 13 wherein said plugging means comprises at least two half-washers inserted between the disk and the corresponding one of said plurality of flanges.

15. A farm machine as recited in claim 1 wherein:
(a) said disk of each one of said plurality of tools for working the soil has a curved shape with a certain curvature; and
(b) said mould board of the corresponding one of said plurality of scraper-mould board units forms, with a plane tangential to said curvature and resting on the outside perimeter of said disk in a zone near said mould board, an angle of between 10° and 40°.

16. A farm machine as recited in claim 15 wherein said angle is at least approximately 20°.

17. A farm machine as recited in claim 1 wherein said scraper of each one of said plurality of scraper-mould board units forms, with the concave face of the disk of the corresponding one of said plurality of tools for working the soil, an angle of incidence of between 10° and 30°.

18. A farm machine as recited in claim 17 wherein said angle of incidence is at least approximately 20°.

19. A farm machine as recited in claim 1 wherein said mould board of each one of said plurality of scraper-mould board units has a length of between 150 and 450 millimeters.

20. A farm machine as recited in claim 19 wherein said length is at least approximately 300 millimeters.

21. A farm machine for working the soil, said farm machine comprising:
(a) a frame;
(b) hitching means connected to said frame for hitching said machine to a tractor during use of said farm machine;
(c) a rotor having a longitudinal axis that, during use of said machine, is at least approximately parallel to the ground and extends obliquely in relation to a work direction so that said rotor has a forward end and a rearward end considering said work direction, said rotor being equipped with:
(i) a central beam and,
(ii) a plurality of tool units for working the soil fastened to said central beam, each one of said plurality of tool units for working the soil comprising:
(A) a disk fastened to said central beam and having an outside perimeter and a concave face, said concave face being directed towards said forward end of said rotor, and (B) a plurality of soil circumferentially spaced spade members removably fastened to said disk in such a manner that said concave face of said disk remains smooth without any protrusion, each one of said plurality of soil spade members going beyond said outside perimeter of said disk and extending at least approximately in the extension of said disk;

(d) a plurality of scraper-mould board units, each one of said plurality of scraper-mould board units being associated with a corresponding one of said plurality of tool units for working the soil in such a manner that it extends, considering said work direction, behind said central beam and works with said concave face of said disk of said corresponding one of said plurality of tool units for working the soil, each one of said plurality of scraper-mould board units comprising:

(i) a scraper having a scraping edge:
(A) which extends in part at least below an at least approximately horizontal plane containing said longitudinal axis of said rotor;
(B) which extends close to the concave face of the corresponding one of said disks; and
(C) which has an angle of incidence of less than 30°, said scraping edge being sized, shaped, and positioned to scrape soil from the concave face of said disk, and (ii) a mould board;
(A) which extends from said scraping edge and
(B) which forms an angle of less than 40° with a plane tangential to the curvature of the corresponding one of said plurality of disks and resting on the perimeter of the corresponding one of said plurality of disks in the zone of said scraper-mould board unit, said mould board being sized, shaped, and positioned to turn over the soil dug up by the corresponding soil spade members and transported by the corresponding one of said disks; and (e) driving means receiving movement, during use, from a power source to rotate said rotor around its longitudinal axis in a direction of rotation such that said plurality of tool units for working the soil are moving forward at their highest positions.

22. A farm machine as recited in claim 21 wherein said scraping edge has an angle of incidence of between 10° and 30°.

23. A farm machine as recited in claim 22 wherein the angle which said mould board forms with said plane is between 10° and 40°.

24. A farm machine as recited in claim 21 wherein the angle which said mould board forms with said plane is between 10° and 40°.

* * * * *